United States Patent
Nayak et al.

(10) Patent No.: US 9,445,385 B2
(45) Date of Patent: Sep. 13, 2016

(54) SYSTEM AND METHODS FOR IMPROVING NETWORK REGISTRATION FOR ALL SIMS OF A MULTI-SIM DEVICE USING A DYNAMICALLY-DETERMINED REGISTRATION ORDER

(71) Applicant: QUALCOMM Incorporated, San Diego, CA (US)

(72) Inventors: Shivank Nayak, Hyderabad (IN); Ajeet Kumar, Hyderabad (IN); Rajesh Madhukar Patil, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 14/188,796

(22) Filed: Feb. 25, 2014

(65) Prior Publication Data
US 2015/0245309 A1    Aug. 27, 2015

(51) Int. Cl.
*H04W 4/00* (2009.01)
*H04W 60/00* (2009.01)
*H04W 72/10* (2009.01)
*H04W 8/18* (2009.01)
*H04W 88/06* (2009.01)

(52) U.S. Cl.
CPC .......... *H04W 60/005* (2013.01); *H04W 8/183* (2013.01); *H04W 72/10* (2013.01); *H04W 88/06* (2013.01)

(58) Field of Classification Search
CPC ..... H04W 8/18; H04W 8/183; H04W 48/16; H04W 48/18; H04W 48/20; H04W 60/00; H04W 88/06
USPC ............................ 455/435.1, 552.1, 557, 558
See application file for complete search history.

(56) References Cited

U.S. PATENT DOCUMENTS

| | | | |
|---|---|---|---|
| 8,185,157 B2 | 5/2012 | Shi | |
| 8,565,196 B2 | 10/2013 | Yang et al. | |
| 2004/0229601 A1* | 11/2004 | Zabawskyj | H04W 76/025 455/417 |
| 2009/0061932 A1 | 3/2009 | Nagarajan | |
| 2012/0052911 A1 | 3/2012 | Chin et al. | |
| 2012/0225651 A1 | 9/2012 | Rysgaard | |
| 2012/0231802 A1 | 9/2012 | Ngai | |
| 2013/0148574 A1* | 6/2013 | Liu | H04W 36/08 370/328 |
| 2013/0237197 A1 | 9/2013 | Ruvalcaba et al. | |
| 2013/0303203 A1* | 11/2013 | Wang | H04W 68/00 455/458 |

FOREIGN PATENT DOCUMENTS

| | | |
|---|---|---|
| CN | 101094476 A | 12/2007 |
| WO | 2012089634 A1 | 7/2012 |
| WO | 2013014000 A1 | 1/2013 |

OTHER PUBLICATIONS

International Search Report and Written Opinion—PCT/US2015/017343—ISA/EPO—May 28, 2015.

* cited by examiner

*Primary Examiner* — Temica M Beamer
(74) *Attorney, Agent, or Firm* — The Marbury Law Group, PLLC

(57) ABSTRACT

Methods and devices are disclosed for enabling efficient network registration using a shared radio resource for at least a first and second SIM of a multi-SIM wireless communication device. An overall priority-based ranking may be calculated for each SIM of the multi-SIM device, which may be used to determine an preferred order for the SIMs to register for services in their respective networks. Calculating the overall priority-based ranking for each SIM may include determining values for a service capability priority factor, an attachment time factor, and a sleep cycle duration factor.

28 Claims, 9 Drawing Sheets

500a

|  | SIM-A | SIM-B | SIM-C |  |
|---|---|---|---|---|
| Service capability | CS & PS | PS | CS | 502 |
| Important services (initial user designations and/or frequently used) | No | No | No | 504 |
| Service capability priority value | 30 | 20 | 10 | 506 |

500b

|  | SIM-A | SIM-B | SIM-C |  |
|---|---|---|---|---|
| RAT mode | WCDMA | GSM | LTE | 508 |
| Sleep cycle duration value | 20 | 30 | 10 | 510 |

500c

|  | SIM-A | SIM-B | SIM-C |
|---|---|---|---|
| Last attachment time value | 30 | 10 | 20 |

FIG. 5

SYSTEM AND METHODS FOR IMPROVING NETWORK REGISTRATION FOR ALL SIMS OF A MULTI-SIM DEVICE USING A DYNAMICALLY-DETERMINED REGISTRATION ORDER

BACKGROUND

Multi-SIM wireless devices have become increasing popular because of the versatility that they provide, particularly in countries where there are many service providers. For example, dual-SIM wireless devices may allow a user to implement two different plans or service providers, with separate numbers and bills, on the same device (e.g., business account and personal account). Also, during travel, users can obtain local subscriber identification module (SIM) cards and pay local call rates in the destination country. By using multiple SIMs, a user may take advantage of different pricing plans and save on mobile data usage.

In various types of multi-SIM wireless communication devices, each modem stack associated with a subscription may store information provisioned by its respective network operator in a SIM, which may allow the SIM to support use of various different communication services. For example, various wireless networks may be configured to handle different types of data, use different communication modes, implement different radio access technologies, etc.

One type of multi-SIM wireless device, referred to as a dual-SIM dual active (DSDA) device, allows simultaneous active connections with the networks corresponding to two SIMs using separate transmit/receive chains associated with each SIM. Such separate components may provide convenience to a user, but may require high power consumption during operation. Another type of multi-SIM wireless device, referred to as a dual-SIM dual standby (DSDS) device, includes a single radio resource and typically provides for a "standby" mode (i.e., idle mode) in which services associated with either SIM may originate or terminate a communication (e.g., a voice call or data call), and in which services associated with both SIMs may receive pages using the shared radio resource. By sharing a radio resource between the services enabled by both SIMs, a DSDS device may allow for a longer battery life than that of a DSDA device, as well as other benefits (e.g., lower cost of the device, avoiding receiver desense from co-located radios, etc.).

In a conventional DSDS device, the order in which the SIMs may register on their selected networks may be predetermined, such as based on a user's designation of a primary SIM, a default priority setting, etc. However, in some scenarios the conventional predetermined registration order may be undesirable, such as when the network of the first SIM to register is associated with multiple communication modes or time-consuming access procedures, and/or when there is a delay in acquiring service caused by a problem on the network. As a result, the predetermined order may lead to a long out-of-service period on the second SIM, thereby increasing the overall time for both SIMs to successfully register for service.

SUMMARY

Systems, methods, and devices of the various embodiments enable a multi-SIM wireless communication device to control use of a shared radio resource for efficient network registration of services supported by at least a first and a second SIM by dynamically calculating an overall priority-based ranking associated with each of the first and second SIMs, determining a preferred order for service registration in selected networks associated with the first and second SIMs, and granting use of the radio resource to modem stacks associated with the first and second SIMs based on the preferred order.

In some embodiment systems, methods and devices, granting use of the radio resource to modem stacks associated with the first and second SIMs based on the preferred order may include identifying a top registration priority SIM based on the preferred order, granting use of the radio resource to a modem stack associated with a top registration priority SIM according to the preferred order, determining whether the top registration priority SIM has successfully registered for service in a selected network; allowing a next SIM in the preferred order to register for service in a selected network in response to determining that the top registration priority SIM has successfully registered for service, and preventing the next SIM in the preferred order from registering for service in response to determining that top registration priority SIM has not successfully registered for service.

In some embodiment systems, methods and devices, dynamically calculating an overall priority-based ranking associated with each of the first and second SIMs may include determining for each SIM at least one of a service capability priority value, an attachment time value, and a sleep cycle duration value, and applying a prioritization equation to the at least one of the determined service capability priority value, attachment time value, and sleep cycle duration value for each SIM, in which a result of the prioritization equation may be used as the overall priority-based ranking associated with the SIM,

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 5 is a data structure diagram illustrating example data tables that may store information to be used in calculating an overall priority-based ranking for each SIM of a tri-SIM wireless communication device.

DETAILED DESCRIPTION

Figure 1:
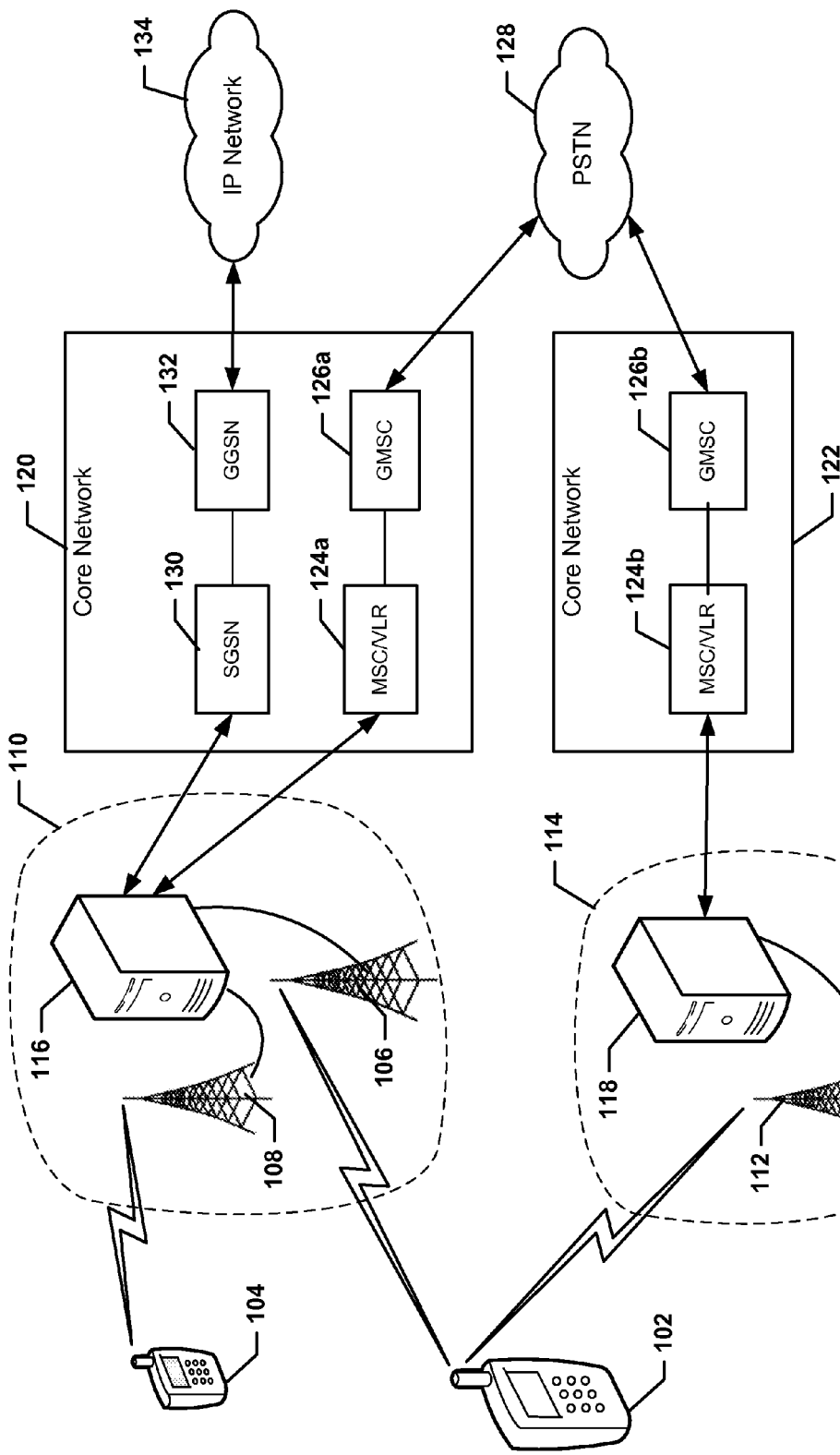
FIG. 1 is a communication system block diagram of a network suitable for use with the various embodiments.

The various embodiments will be described in detail with reference to the accompanying drawings. Wherever possible the same reference numbers will be used throughout the drawings to refer to the same or like parts. References made to particular examples and implementations are for illustrative purposes, and are not intended to limit the scope of the invention or the claims.

The various embodiments provide more efficient processes for registering a multi-SIM, single radio wireless communication device for network services. In the various embodiments, priorities may be determined for each of the services associated with the multiple SIMS, an overall priority-based ranking may be determined for those services, and a preferred order for conducting service registrations may be determined. Use of the shared radio resource by the modem stacks associated with each of the SIMs for conducting service registrations may then be enabled based on the determined preferred order.

The terms "wireless device," and "wireless communications device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways enabled by two or more SIMs.

As used herein, the terms "SIM", "SIM card" and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless device on a network and enable a communication service with the network. Because the information stored in a SIM enables the wireless device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM. For example, references to assigning a radio resource to a SIM (or granting a SIM radio access) means that the radio resource has been allocated to establishing or using a communication service with a particular network that is enabled by the information stored in that SIM.

As used herein, the terms "multi-SIM wireless communication device," "multi-SIM wireless device" "dual-SIM wireless communication device" "dual-SIM dual active device" and "DSDA device" are used interchangeably to describe a wireless device that is configured with more than one SIM and is capable of independently handling communications with networks of all subscriptions.

As used herein, the terms "wireless network," "cellular network," "system" "public land mobile network" and "PLMN" are used interchangeably to describe a wireless network of a carrier associated with a wireless device and/or subscription on a wireless device, and/or its roaming partners.

As used herein, the terms "service signal," "pilot signal," "carrier frequency," "carrier signal," "beacon signal," and "BCCH carrier frequency" are used interchangeably to describe a base frequency signal which a network broadcasts from a base transceiver station (BTS), radio base station (RBS), or node B in order to advertise its presence, operator identity, and other necessary initial information.

The term "acquisition" when used herein with respect to a network or service on a network refers to performing idle mode functions including acquiring BCCH carrier frequencies associated with a SIM. Acquisition may involve scanning a list of previously-acquired PLMNs and their BCCH carrier frequencies and/or scanning frequency bands to identify channels which are BCCH carrier frequencies and above a threshold signal strength. Acquiring BCCH carrier frequencies may further include attempting to receive control channel information on the identified channels, such as detecting a tone on a Frequency Correction Channel (FCCH), decoding a burst of a Synchronization Channel (SCH), and reading system information from a BCCH.

The term "camping" when used herein with respect to a cell or network refers to selecting a suitable cell of a selected PLMN by choosing an acquired service signal broadcasting an identifier of the selected PLMN and tuning to control channels of that cell.

As used herein, the terms "registration" and "attachment" when used herein with respect to a network or system refer to steps in which, a wireless device, having camped on a suitable cell, registers its presence in the network by performing particular messaging exchanges with one or more network entities (e.g., performing a location update, GPRS attach, or IMSI attach procedure in GSM). Reference herein to registration also encompasses successful completion of any necessary preceding steps defined by the applicable protocol standards (e.g., carrier channel acquisition, PLMN selection, cell selection and camping, etc. in GSM).

Messages exchanged in particular registration procedures may vary based on elements including, but not limited to, the network operator, system architecture, communications protocol, radio access technology (RAT) being used, etc. While reference may be made to registration and/or attachment procedures set forth in GSM standards they are provided merely as examples, and the claims apply to other types of cellular telecommunication networks and technologies.

Wireless communication networks are widely deployed to provide various communication services such as voice, packet data, broadcast, messaging, and so on. These wireless networks may be capable of supporting communications for multiple users by sharing the available network resources. Examples of such wireless networks include the Global System for Mobile Communications (GSM), Code Division Multiple Access (CDMA) networks, Time Division Multiple Access (TDMA) networks, and Frequency Division Multiple Access (FDMA) networks. Wireless networks may also utilize various radio technologies such as Wideband-CDMA (W-CDMA), cdma2000, Global System for Mobile Communications (GSM), etc.

A multi-SIM device exiting a radio-off state (e.g., powering on the device, turning off aircraft mode, etc.) may acquire and register for service with selected networks using the information stored in each of its SIMs. In a DSDS wireless device in which two or more SIMs share a common radio resource, the SIMs and their associated protocol stack take turns using the shared radio resource to perform system acquisition and registration processes with a network and service associated with a SIM. Typically, the order in which the DSDS wireless device enables each SIM and its associated protocol stack to use the shared radio resource may be arbitrary, such as "first-come first-serve." Alternatively, in some multi-SIM devices, use of the shared radio resource may be granted to SIMs based on a user-selected priority, and/or a default priority assigned to the slots that house the SIM cards. However, the time to register for service and the subsequent use of the radio resource by an acquired service the impact the ability of the other SIM to conduct its service registration process. As a result, the network registration order may be largely arbitrary, and may be inefficient for overall operation of the device.

For example, once a first SIM has registered in a selected network using the shared radio resource, a service supported by the first SIM may initiate an active communication session. Consequently, other SIMs of the device may be prevented from selecting networks and registering for service until the modem stack associated with the first SIM has released the radio resource or until there is a tune-away interval. Further, in cases in which a service supported by the one or more other SIM may miss incoming call requests of greater priority than the active communication session, the registration order may unnecessarily sacrifice availability of a time critical service (e.g., voice calls) for registering services that are not time critical (e.g., email).

In current mobile communications, wireless service carriers have standardized a number of techniques for selecting wireless communications systems and obtaining service therefrom, in accordance with preferences of the subscriber's service provider/carrier. Service providers generally enable subscribers to access a network by providing provisioning information to subscriber devices.

Wireless service carriers/service providers may establish public land mobile networks (PLMNs) to provide communication services to the public. Each PLMN may support cells that use one or many different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology). For ease of description, the embodiments are described below for GSM-type networks, but the embodiments may equally be applied to networks using any other radio technologies or protocol.

An example GSM network may operate on any of a number of GSM bands (e.g., GSM 900, GSM 850, etc.), each of which cover multiple radio frequency (RF) channels identified in 3GPP TS 05.05, entitled "Digital cellular telecommunications system (Phase 2+); Radio transmission and reception (Release 1999)." Further, each GSM network typically operates on a specific set of RF channels in a specific GSM band. In describing the various embodiments, the terms "channel," and "frequency" may be used interchangeably and may refer to channels in GSM bands, and/or channels in other network bands.

A multi-SIM wireless device in which a baseband-modem processor implements protocols associated with two or more SIMs to share access to a single radio resource may be configured to operate in "standby mode." For example, in dual-standby mode on a DSDS device, the communication services enabled by each SIM may both enter idle mode, but while a communication service enabled by one SIM is transmitting or receiving data, the communication service enabled by the other SIM may be unavailable for use. Other multi-SIM wireless communication devices may be configured to operate more than two SIMs in standby mode, thereby sharing a radio resource among at least three SIMs (e.g., a tri-SIM tri-standby (TSTS) device). The SIMs in a multi-SIM wireless communication device may be associated with the same or different networks. Each SIM may generally be provisioned by a service provider with a list of preferred PLMNs from which the wireless device may receive service (i.e., a home PLMN and roaming partner PLMNs).

Although multi-SIM wireless communication devices offer a variety of options to the end user, they also necessitate efficient execution of complex tasks. In particular, DSDS wireless devices generally have separate modem stacks, each associated with a SIM, that share a single radio, such that if one modem stack is involved in an active communication the other modem stack is denied radio access.

Upon recovering from a radio-off condition, a conventional wireless device may identify available cells in its vicinity by scanning the channels in a list of previously-acquired Broadcast Control Channel (BCCH) carrier or by scanning and measuring signal strength on the channels of each enabled frequency band, and may identify those channels that are above a threshold signal strength as being potential BCCH carrier. Upon detecting that a channel is a BCCH carrier, the wireless device typically tunes to the carrier frequency. On this frequency, the wireless device may read a Synchronization Channel (SCH) to obtain a base station identity code (BSIC), followed by reading the BCCH to obtain system information (e.g., a PLMN identifier).

A conventional wireless device may also select a desired PLMN based on a preferred PLMN list (i.e., automatic mode) stored in a SIM or by being presented with a list containing all networks found from the PLMN identifiers obtained on BCCH carrier frequencies, and may select one from the list stored in the SIM (i.e., manual mode). A conventional wireless device may attempt to find a suitable cell for camping on by passing through the list in descending order of received signal strength, and selecting a BCCH carrier frequency with sufficient signal strength that satisfies a set of requirements. The device may camp on the cell by tuning to its control channels.

Once camped on a cell of its selected network, a conventional wireless device may attempt to register its presence in the selected network, such as by a location registration, GPRS attach, or IMSI attach procedure.

While a multi-SIM wireless communication device may be configured to share resources among different SIMs, these conventional processes may be performed sequentially by each SIM in order to successfully register for supported services in each respective network. Thus, while the shared radio resource is performing the processes that scanning BCCH carrier frequencies identified in one SIM, camping on a selected network cell in registering for service, the service is supported by the other SIM must wait their turn.

The various embodiments provide methods for controlling the order in which the network registration processes outlined above may be performed for services/networks enabled by the two or more SIMs sharing a radio resource on a multi-SIM device. In the various embodiments, a registration order may be determined by calculating a priority for each SIM based on known information about the supported services and measures of actual performance and settings associated with the SIMs. Specifically, the embodiments provide methods of quantifying various dynamically and statically determined factors associated with each SIM, inputting these factors into an equation to calculate an overall priority-based ranking corresponding to each SIM, and identifying a registration order based on ascending numerical priority. In this manner, the various embodiments may minimize the registration delay for time critical services, and improve total registration time across all SIMs of the multi-SIM device, thereby providing improved user experience and modem performance.

FIG. 1 illustrates a wireless network system 100 suitable for use with the various embodiments. Wireless devices 102, 104 may be configured to establish wireless connections with cell towers or base stations of one or more radio access networks. For example, wireless devices 102, 104 may transmit/receive data using base stations 106, 108, which may be part of a network 110, as is known in the art. Wireless device 102 may further be configured to transmit/receive data through base station 112, which may be part of a different network 114. The wireless networks 110, 114 may be cellular data networks, and may use channel access methods including, but not limited to, Global System for Mobile Communications (GSM), Universal Mobile Telecommunications Systems (UMTS) (particularly, Long Term Evolution (LTE)), Frequency Division Multiple Access (FDMA), Time Division Multiple Access (TDMA), Code Division Multiple Access (CDMA), Wi-Fi, PCS, G-3, G-4, or other protocols that may be used in a wireless communications network or a data communications network. The networks 110, 114 may also be referred to by those of skill in the art as access networks, radio access networks, base station subsystems (BSSs), UMTS Terrestrial Radio Access Networks (UTRANs), etc. Networks 110, 114 may use the same or different wireless interfaces and/or physical layers. In an embodiment, base stations 106, 108, 112 may be controlled by one or more base station controllers (BSC) 116, 118. For example, base stations 106, 108, BSC 116, and other components may form network 110, as is known in the art. Alternate network configurations may also be used and the embodiments are not limited to the configuration illustrated. For example, in another embodiment the functionality of the BSC 116 and at least one of base stations 106, 108 may be collapsed into a single "hybrid" module having the functionality of these components.

In the various embodiments, a wireless device 102 may simultaneously access core networks 120, 122 after camping on cells managed by base stations 106, 112. Each core network 120, 122 may provide various services to the wireless device 102 via respective connections to networks 110, 114. In various embodiments, core networks 120, 122 may each include a circuit-switched (CS) domain. Examples of circuit-switched entities that may be part of core networks 120, 122 include a mobile switching center (MSC) and visitor location register (VLR), identified as MSC/VLRs 124a, 124b, as well as Gateway MSCs (GMSCs) 126a, 126b. Core networks 120, 122 may be interconnected by connections from respective GMSCs 126a, 126b to the public switched telephone network (PSTN) 128, across which the core networks 120, 122 may route various incoming and outgoing communications to the wireless device 102.

One or more core network, such as core network 120, may also include a packet-switched (PS) domain. Example packet-switched elements that may be part of core network 120 include a Serving GPRS Support Node (SGSN) 130 and a Gateway GPRS Support Node (GGSN) 132. The GGSN 132 may be connected to an IP network 134, across which core network 120 may route IP data traffic to and from the wireless device 102. Other network entities (not shown) that may be part of the core network 120 may include an Equipment Identity Register (EIR), Home Location Register (HLR), and Authentication Center (AuC), some or all of which may be shared by both the circuit-switched and packet-switched domains.

Wireless device 102 may also establish connections with Wi-Fi access points, which may connect to the Internet. While the various embodiments are particularly useful with wireless networks, the embodiments are not limited to wireless networks and may also be implemented over wired networks with no changes to the methods.

In a wireless network system 100, a wireless device 102 may be a multi-SIM wireless communication device that is capable of operating with a number of wireless networks enabled by information stored in a plurality of SIMs. For example, the wireless device 102 may be a dual-SIM wireless communication device. Using dual-SIM functionality, the wireless device 102 may simultaneously access two core networks 120, 122 by camping on cells managed by base stations 106, 112.

For example, a multi-SIM wireless device 102 may make a voice or data call to a third party device, such as wireless device 104, using a service enabled by information stored in one of the SIMs, as well as the modem stack associated with that SIM, via the shared radio resource. The multi-SIM wireless device 102 may also receive a voice call or other data transmission from a third party in a similar manner. The third party device (e.g., wireless device 104) may be any of a variety of devices, including, but not limited to, a mobile phone, laptop computer, PDA, server, etc.).

Some or all of the wireless devices 102 may be configured with multi-mode capabilities and may include multiple transceivers for communicating with different wireless networks over different wireless links/radio access technologies. For example, a DSDS wireless device 102 may be configured to camp two SIMs on cells of two different networks though the same transmit/receive chain (i.e., a single shared radio resource) and communicate over the two wireless data networks on different subscriptions by taking turns using the transmit/receive chain.

For clarity, while the techniques and embodiments described herein relate to a wireless device configured with at least one GSM subscription, they may be extended to subscriptions on other radio access networks (e.g., cdma2000, UMTS, WCDMA, LTE, etc.).

Figure 2A:
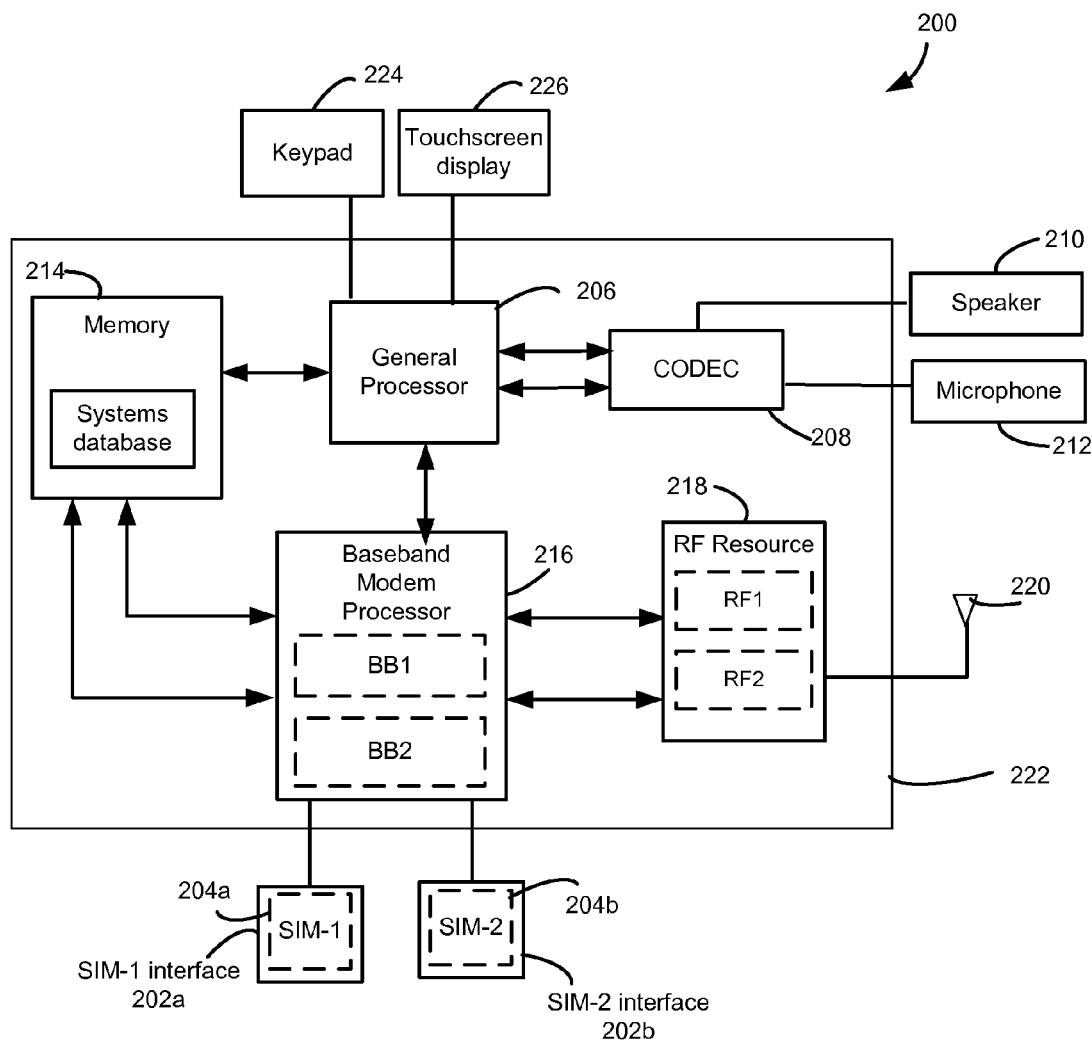
FIG. 2A is a component block diagram illustrating a dual-SIM dual standby wireless communications device according to an embodiment.

FIG. 2A is a functional block diagram of a multi-SIM wireless device 200 that is suitable for implementing the various embodiments. Wireless device 200 may include a first SIM interface 202a, which may receive a first identity module SIM-1 204a that is associated with the first subscription. The wireless device 200 may also include a second SIM interface 202b, which may receive a second identity module SIM-2 204b that is associated with the second subscription.

A SIM in the various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM may have a CPU, ROM, RAM, EEPROM and I/O circuits. A SIM used in the various embodiments may contain user account information, an IMSI a set of SIM application toolkit (SAT) commands and storage space for phone book contacts. A SIM may further store home identifiers (e.g., a System Identification Number (SID)/Network Identification Number (NID) pair, a Home PLMN (HPLMN) code, etc.) to indicate the SIM network operator provider. An Integrated Circuit Card Identity (ICCID) A SIM serial number may be printed on a SIM card for identification.

A multi-SIM wireless device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. Memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store a database or list of services or service categories that have been predefined as time critical or non-time critical, as described in further detail below with reference to FIGS. 5A and 5B.

The general purpose processor 206 and memory 214 may each be coupled to at least one baseband modem processor 216. Each SIM in the wireless device 200 (e.g., SIM-1 202a and SIM-2 202b) may be associated with a baseband-RF resource chain. A baseband-RF resource chain may include baseband modem processor 216, which may perform baseband/modem functions for communications on at least one SIM. The baseband-RF resource chain may also include one or more amplifiers and radios, referred to generally herein as the radio resource/RF resource 218. The RF resource may be coupled to an antenna 220, and may perform transmit/receive functions for at least one SIM of the wireless device. In an embodiment, RF resource 218 may include separate transmit and receive circuitry, or may include a transceiver that combines transmitter and receiver functions. The RF resource 218 may be coupled to a wireless antenna 220 for sending and receiving RF signals.

A DSDS wireless device 200 may have a common baseband-RF resource chain for all SIMs in the wireless device (i.e., a single baseband modem processor 216, a single RF resource 218, and a single antenna 220). In another embodiment, different SIMs may be associated with separate baseband-RF resource chains that include physically or logically separate baseband modem processors (e.g., BB1, BB2), each of which may be coupled to a common RF resource 218 (i.e., a single device that performs transmit/receive functions for all SIMs on the wireless device).

In a particular embodiment, the general purpose processor 206, memory 214, baseband modem processor(s) 216, and RF resource 218 may be included in a system-on-chip device 222. The first and second SIMs 204a, 204b and their corresponding interfaces 202a, 202b may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In an embodiment, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in wireless device 200 to enable communication between them, as is known in the art.

Figure 2B:
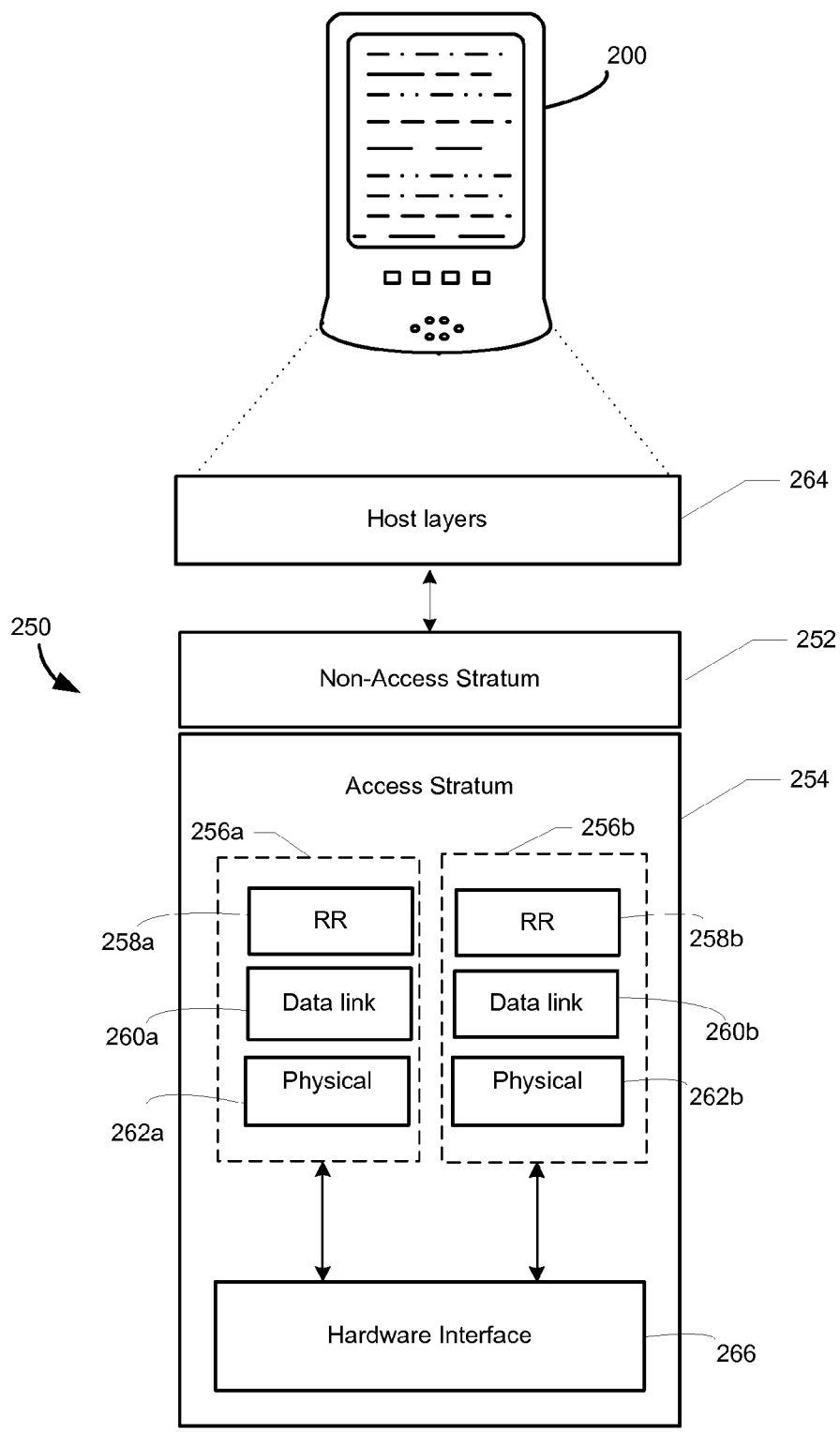
FIG. 2B is a system architecture diagram illustrating example protocol layer stacks implemented by the dual-SIM wireless communication device of FIG. 2A.

Referring to FIG. 2B, wireless device 200 may have a layered software architecture 250 to communicate over access networks associated with SIMs. The software architecture 250 may be distributed among one or more processors, such as baseband modem processor 216. The software architecture 250 may also include a Non Access Stratum (NAS) 252 and an Access Stratum (AS) 254. The NAS 252 may include functions and protocols to support traffic and signaling between SIMs of the wireless device 200 (e.g., SIM-1 204a, SIM-2 204b) and their respective core networks. The AS 254 may include functions and protocols that support communication between the SIMs (e.g., SIM-1 204a, SIM-2 204b) and entities of their respective access networks (such as a MSC if in a GSM network).

In the multi-SIM wireless communication device 200, the AS 254 may include multiple protocol stacks, each of which may be associated with a different SIM. The protocol stacks may be implemented to allow modem operation using information provisioned on multiple SIMs. As such, a protocol stack that is executed by a baseband modem processor, which may also be referred to herein as a modem stack In an example embodiment, the AS 254 may include protocol stacks 256a, 256b, associated with SIMs 208a, 208b, respectively. Although described below with reference to GSM-type communication layers, protocol stacks 256a, 256b may support any of variety of standards and protocols for wireless communications. Each protocol stack 256a, 256b may respectively include Radio Resource management (RR) layers 258a, 258b. The RR layers 258a, 258b may be part of Layer 3 of a GSM signaling protocol, and may oversee the establishment of a link between the wireless device 200 and associated access networks. In the various embodiments, the NAS 252 and RR layers 258a, 258b may perform the various functions to search for wireless networks and to establish, maintain and terminate calls.

In an embodiment, each RR layer 258a, 258b may be one of a number of sub-layers of Layer 3. Other sub-layers may include, for example, connection management (CM) sub-layers (not shown) that route calls, select a service type, prioritize data, perform QoS functions, etc.

Residing below the RR layers 258a, 258b, protocol stacks 256a, 256b may also include data link layers 260a, 260b, which may be part of Layer 2 in a GSM signaling protocol. Data link layers 260a, 260b may provide functions to handle incoming and outgoing data across the network, such as dividing output data into data frames and analyzing incoming data to ensure it has been successfully received. In an embodiment, each data link layer 260a, 260b may contain various sub-layers (e.g., media access control (MAC) and logical link control (LLC) layers (not shown)). Residing below the data link layers 260a, 260b, protocol stacks 256a, 256b may also include physical layers 262a, 262b, which may establish connections over the air interface and manage network resources for the wireless device 200.

While the protocol stacks 256a, 256b provide functions to transmit data through physical media, the software architecture 250 may further include at least one host layer 264 to provide data transfer services to various applications in the wireless device 200. In an embodiment, application-specific functions provided by the at least one host layer 264 may provide an interface between the protocol stacks 256a, 256b and the general purpose processor 202. In an alternative embodiment, the protocol stacks 256a, 256b may each include one or more higher logical layers (e.g., transport, session, presentation, application, etc.) that provide host layer functions. In an embodiment, the software architecture 250 may further include in the AS 254 a hardware interface 266 between physical layers 262a, 262b and the communication hardware (e.g., one or more RF transceivers).

The baseband-modem processor of the multi-SIM device may be configured to execute software including at least two protocol stacks associated with at least two SIMs, respectively. The SIMs and associated protocol stacks may be configured to support a variety of communication services that fulfill different user requirements. Further, a particular SIM may be provisioned with information to execute different signaling procedures for accessing a domain of the core network associated with these services and for handling data thereof.

For example, as discussed above with reference to in FIG. 1, a GSM network may have a circuit switched (CS) domain and a packet switched (PS) domain to support services that use circuit-switched data and packet-switched data, respectively. Various qualities of these communication modes may render them favorable or unfavorable for particular services. For example, circuit switching is connection-oriented, and involves a dedicated channel to the destination end point, providing exclusive use of the circuit for the duration of the communication. Circuit switching guarantees quality of service by enabling reliability that data will arrive with constant bandwidth and at constant delay, in the order in which it was transmitted. However, regardless of the amount of data actually transmitted, an originating device will generally be charged for the duration of the call. For services in which such a dedicated channel is unnecessary, circuit switching may be expensive and waste network resources. Example services for which circuit switching may be ideal include voice calls over the public switched telephone network, communications using Integrated Services for Digital Network (ISDN) standards, optical fiber-based transport network services, and other connection-oriented services that may require guaranteed quality of service and reliability.

Packet switching involves using shared network resources instead of channels dedicated for use by a particular communication. In packet switched communications, network resources are "always on" but are allocated only when needed for data transfer, after which they are released. Packet switching allows users to obtain connectivity without lengthy setup, and provides higher speed transfer than circuit switching. However, since bandwidth is shared between multiple communication sessions, packet switched communication does not provide the guaranteed quality of service in circuit switching. Example services for which packet switching may be ideal include those supporting email, broadcast, and web browsing applications, as well as other applications in which data is transmitted in bursts as opposed to continuous data transfer.

A suitably provisioned multi-SIM wireless communication device may receive wireless services from more than one wireless network. Upon initial power up, exiting an operating mode in which radios are deactivated (e.g., airplane mode), or following a loss of service situation (e.g., when the devices is in an elevator or beyond communication range of any cell tower), the modem stacks associated with SIMs on a multi-SIM device will be in an out-of-service state. From this condition, the modem stacks of each out-of-service SIM(s) may each attempt to connect with a wireless network that is able to provide service by using the radio resource to search for service signals, select a particular network and cell, and attempt to register in the network. Following registration, a modem stack associated with a SIM may actively engage in communications or go into an idle mode if communication is not required.

As discussed above, only one SIM can use the radio resource to find a network and register for services, requiring one SIM on a multi-SIM device to await access to the shared radio resource before it can perform its service registration procedure. Typically, the order in which the modem stacks associated with the SIMs are granted use of the radio resource for registration processes are predetermined based on fixed settings on the wireless device, such as a default order assigned to the SIM slots, or an order selected in advance by the user. Under certain conditions a predetermined order for registering SIMs with their respective networks may introduce unnecessary delays and power consumption in order to achieve service on both SIMs. One example scenario may arise in a DSDS device when the first SIM to register supports both circuit and packet switched communication services, and the second SIM supports only circuit switched communication services. In this scenario, once the radio resource is available for use the modem stack of the first SIM may attempt to register in a selected network for CS services, followed by an attempt to register for PS services (assuming a combined attach is not supported). The second SIM waiting to register may be forced to remain out-of-service until the first SIM has successfully registered for both CS and PS services, after which the second SIM may attempt registration for CS services in a respective selected network. Thus, the total time for the device to register for service on both SIMs would be the sum of the time for CS registration on the first SIM, the time for PS registration on the first SIM, and the time for CS registration on the second SIM. Additionally, the modem stack associated with the second SIM may miss network pages of incoming calls for the duration of time for CS registration of the first SIM, the duration of time for PS registration for the first SIM, and the duration of time for CS registration for the second SIM. Further, once the first SIM successfully registers for PS services, an application on the device may begin active PS communication, immediately occupying the radio resource and forcing the second SIM to wait even longer to register for service.

Another delay may arise if the modem stack of the first SIM to register does not initiate active communications, and begins a power-saving mode that includes a cycle of sleep and awake states (e.g., discontinuous reception (DRX)). A modem stack in such power-saving mode may monitor paging channels/receive network pages (i.e., radio use) during the awake state, and be out-of-service (i.e., no radio use) during the sleep state. If the radio access technology of the network in which the first SIM is registered follows a cycle with only short sleep state periods, the second SIM may be afforded only short windows of time in which to complete registration.

If registration order of each of these examples were reversed, the total time to achieve service on both SIMs would be the sum of the time for CS registration on the second SIM plus the time for CS registration on the first SIM. Further, the modem stack associated with the first SIM would only miss network pages of incoming calls for the duration of time for CS registration for the second SIM and the duration of time for CS registration for the first SIM. Therefore, by changing the registration order in this example scenario, the DSDS device would experience a decrease in the total amount of time needed for both SIMs to register for service in a network, as well as a decrease in the duration that one SIM will experience a total paging loss.

To address this problem, the various embodiments may involve prioritizing network registration between SIMs of a multi-SIM wireless device based on dynamically calculated priority-based rankings that take into account such variables that impact the total service registration time. Specifically, upon exiting the radio-off condition, the wireless device processor may calculate an overall priority-based ranking for each SIM, after which the SIMs may be granted use of the radio resource to register in a network in order of the rankings. Calculating the overall priority-based ranking for each SIM may be performed by inputting values of various statically and dynamically determined factors into an equation. Such factors may include a service capability factor, a dynamically-determined attachment time factor, and a statically determined sleep cycle duration factor.

In the various embodiments, a value for the service capability factor of a SIM may be based on the services that the SIM modem stack is capable of supporting, as well as any user designations of important services or SIMs, and/or services that are identified by the device as being frequently used (and therefore considered important). The supported services and user/system-based designations may both be statically-determined components, while changes to the user/system-based designations of services or SIMs may be determined dynamically at run-time. In an embodiment, if changes have been made to the user designations, an updated service capability factor may also be determined dynamically at run-time.

A value for the attachment time factor of a SIM may be based on the amount of time to register in a network for all services supported on that SIM. In particular, the value for the attachment time factor may be dynamically determined and/or updated at run-time using a record of observed network behavior, including total registration time for all services on that SIM observed in the past, and current network and/or radio resource conditions.

A value for the sleep cycle duration factor of a SIM may be based on known durations of the sleep cycles followed in power-saving modes (e.g., DRX mode) across different radio access technologies. That is, the value for the sleep cycle duration factor may be statically-determined based on the radio access technology implemented by the modem stack of the SIM.

Figure 3:
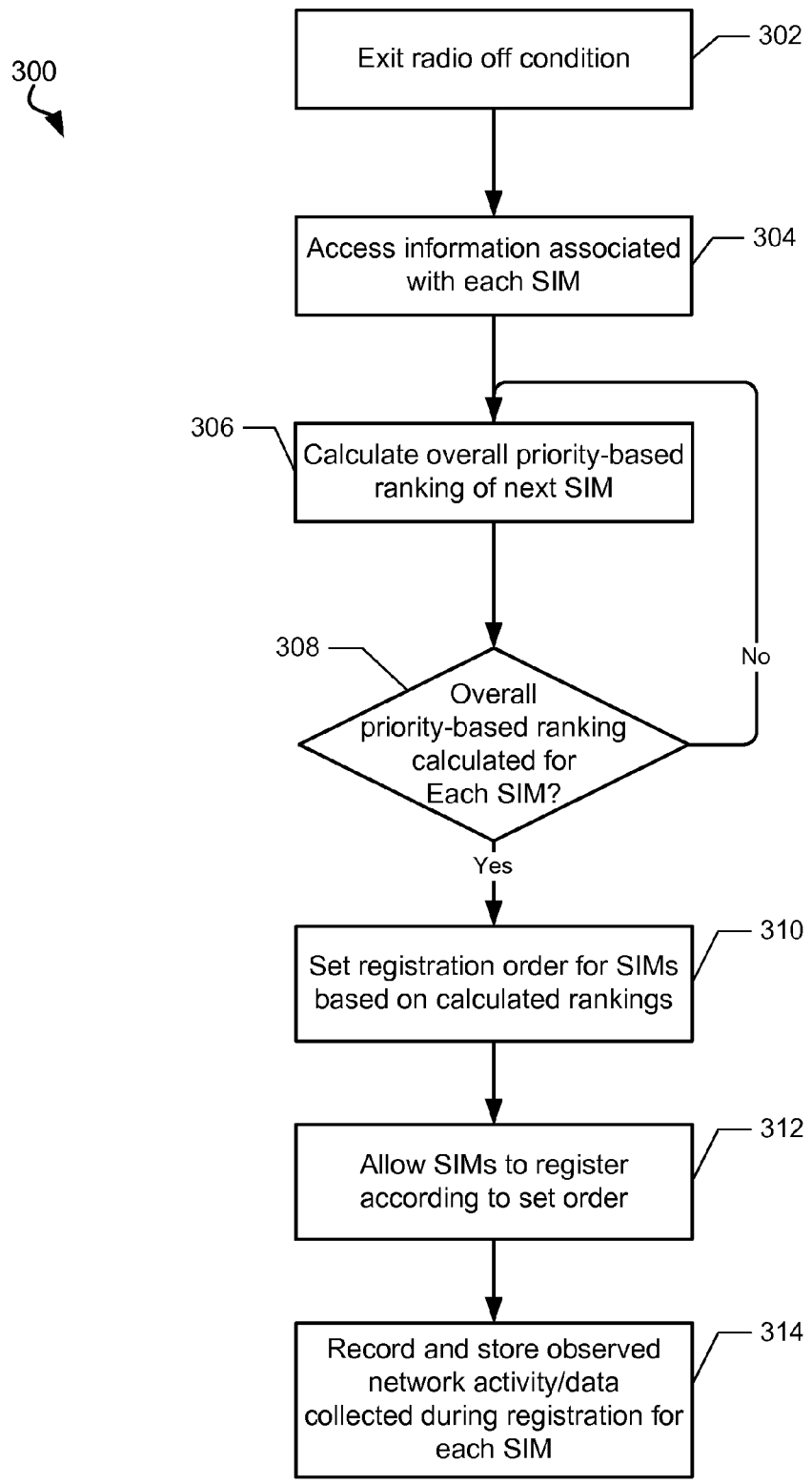
FIG. 3 is a process flow diagram illustrating an embodiment method for improving the order of network registration by the SIMs of a dual-SIM wireless communication device.

FIG. 3 illustrates an embodiment method 300 of determining an order for network registration associated with the SIMs of a multi-SIM wireless device configured with a single radio resource. The operations of method 300 may be implemented by one or more processors of the wireless device, such as the general purpose processor 206 and/or baseband modem processor 216 shown in FIG. 2A, or a separate controller (not shown) that may be coupled to memory and to the baseband modem processor(s) 216.

In block 302 the wireless device processor may detect that a radio-off or out-of-service condition on the wireless device has ended, such by the wireless device being powered on or exiting the airplane mode, and therefore that the radio resource may be available for use.

In block 304 the wireless device processor may access various sources of statically- and dynamically-determined information associated with each SIM. Such information may include a service capability priority value, an attachment time value and a sleep cycle duration value for each SIM provisioned on the wireless device. In various embodiments, some values may have been determined in advance and stored in device memory, as discussed in further detail below with reference to FIG. 5. Further, in various embodiments some dynamically-determined and/or updated values may be stored in temporary memory of the device. The accessed information may also include user settings that are saved on the device, updates or other selections received through a user interface, and information from the radio resource (e.g., received signal strength measurements).

In block 306, the wireless device processor may calculate an overall priority-based ranking of a next SIM of the multi-SIM device using the values and/or other information from block 304. In the various embodiments, calculating the overall priority-based ranking for each SIM may be performed by inputting normalized values for that SIM into a prioritization equation. Depending on the particular prioritization equation, the wireless device processor may interpret the output ranking as an indication of the SIM's relative position "in line" for network registration (e.g., lower ranking output dictates earlier registration). An example prioritization equation according to such an embodiment is discussed detail below with reference to FIG. 6. In alternative embodiments, the overall priority-based rankings may be interpreted as indicative of relative priority (e.g., higher ranking output dictates earlier registration).

In determination block 308, the wireless device processor may determine whether an overall priority-based ranking has been calculated for each SIM of the wireless device. If one or more remaining SIM does not have a corresponding overall priority-based ranking (i.e., determination block 308="No"), the wireless device processor may return to block 306 to calculate the ranking of the next SIM. If each SIM of the wireless device has a corresponding overall priority-based ranking (i.e., determination block 308="Yes"), the wireless device processor may set a registration order based on the calculated rankings. In an example embodiment, the registration order may be a lowest-to-highest ordering of the calculated overall priority-based rankings associated with the SIMs. In block 312, the wireless device processor may allow the SIMs to register in their respective networks according to the order set in block 310. For example, the wireless device processor may first grant use of the radio resource to the modem stack of the SIM associated with the lowest overall priority-based ranking. The wireless device processor may wait for an acknowledgement message confirming successful registration before ending radio access on the first SIM and granting use to modem stack of the next SIM (e.g., SIM associated with a second lowest overall priority-based ranking).

When the modem stack of a SIM is granted use of the radio resource, the wireless device processor may begin monitoring network activity and collecting data relating to the registration procedure. In block 314, observed network activity and data collected during the registration for each SIM may be recorded and stored in memory.

Figure 4:
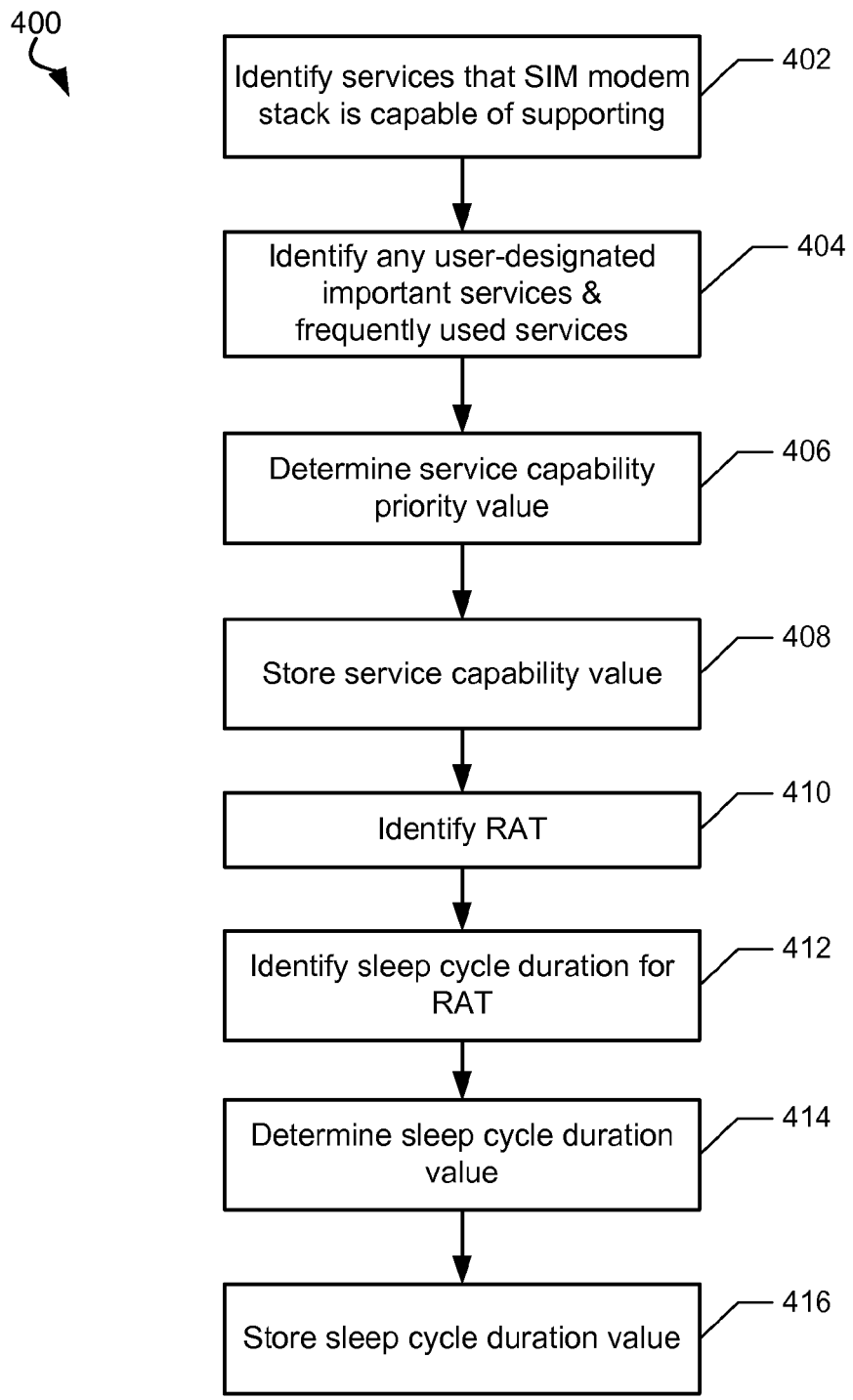
FIG. 4 is a process flow diagram illustrating an embodiment method for generating and storing statically-determined information to be used in determining an overall priority-based ranking for an example SIM of a dual-SIM wireless communication device.

FIG. 4 illustrates an embodiment method 400 of generating and storing statically-determined information to be used in calculating an overall priority-based ranking for an example SIM. Method 400 may be repeated to generate information about each SIM associated with a modem stack that is configured to use a shared radio resource of the wireless device. Therefore, while method 400 may refer to only one example SIM, the example may represent any SIM of the wireless device.

In block 402, the wireless device processor may identify the communication services or types of communication services that the modem stack associated with the SIM may be capable of supporting. For example, the wireless device processor may identify a capability to support CS services, to support PS services, to support both CS and PS services, etc. Such capabilities may be preconfigured by a service provider associated with the SIM, and therefore may be static.

In block 404, the wireless device processor may identify any initial user designations of important services, as well as any frequently used services. In an embodiment, the user may have selected to make a particular type of communication service more important than other services, and such designation may be saved in settings of the wireless device operating system. For example, the user may have an option to designate a group of services as important based on a particular communication mode (e.g., selection of "PS services" or "CS services" in settings). In an alternative embodiment, a user may have an option to designate individual services as important (i.e., option to select "voice call", "SMS", "high-speed data/file transfer session," etc.). In another embodiment, a user may additionally or alternatively have an option to designate all services associated with a particular SIM as being important (i.e., option to select "SIM-A," "SIM-B," etc.) With respect to frequently used services, the wireless device processor may be configured to monitor usage patterns of services, and to identify those services that are frequently used by the user. In an embodiment, the wireless device processor may automatically set frequently used services as being important, regardless of whether they have been designated as important by the user. Further, the services identified as frequently used may be dynamically adjusted by the wireless device processor based on changes in usage patterns.

In block 406, the wireless device processor may determine a service capability priority value for the SIM based on the identified service capabilities, any important services (i.e., initial user designations of important services and frequently used services identified by the device). In the various embodiments, determining the service capability priority value may involve assigning numeric representations (i.e., scores) to the service capabilities and the important services (i.e., user-designated and frequently used). The numeric representations may be derived using a normalized scale suitable to provide relative scoring for multiple characteristics across the SIMs of a device.

The service capability priority value may be determined as a function of a score derived for service capability and of a score derived for important services. In some embodiments, the function may provide a greater weight to one score over the other, such to the service capability score over the important services. In other embodiments, each score may be weighted equally.

A normalized scale from which a score assigned to a non-numeric SIM characteristic may be derived (e.g., service capabilities, important services, etc.) may reflect known properties of networks, radio access technologies, and/or services that could affect suitability of the SIM for registration ahead of other SIMs. For example, a favorable score may be derived for an identified CS service capability since being out-of-CS service may result in missing paging messages for incoming voice calls. In another example, an unfavorable score may be derived for an identified PS service capability since the PS service may tend to occupy the radio resource for a longer period of time, such as by initiating active data communications.

Further, for non-numeric SIM characteristics belonging to a discrete set (e.g., initial user designation of important services and/or identified frequently used services), deriving a numeric representation may involve simply assigning a normalized number to represent each discrete value. For example, a first number may be assigned to represent that a user-designated important service is associated with the SIM, while a second number may be assigned to represent that no user-designated important service is associated with the SIM. While these techniques are discussed with respect to SIM characteristics used to determine a service capability priority value, methods of assigning numeric representations/scores to non-numeric characteristics may also be applied with respect to other factors associated with the SIM (e.g., sleep cycle duration value and/or attachment time value).

In block 408, the determined service capability priority value associated with the SIM may be saved, such as in a table or other data structure stored in the memory of the wireless device memory. In block 410 the wireless device processor may identify one or more radio access technology used by the modem stack associated with the SIM to connect to a network. The identification of the one or more radio access technology may be a static characteristic of the SIM configured by the service provider.

In block 412, the wireless device processor may identify the length of a sleep cycle (i.e., time between awake periods) in a power save mode associated with the identified one or more radio access technology. Such information may be defined by protocols and/or standards associated with the radio access technology and implemented by a service provider. In an embodiment, the sleep cycle length may be preconfigured by the service provider in settings associated with the SIM. In another embodiment, the sleep cycle length may be accessed by querying a known source of information maintained by a service provider or system associated with the radio access technology.

In block 414, the wireless device processor may determine a sleep cycle duration value for the SIM based on the identified sleep cycle duration. In some embodiments, the sleep cycle duration value may be determined as a scaled representation of the time for one sleep cycle in a power saving mode. That is, a scale factor may be applied to the length of time between wake-up periods associated with the identified radio access technology. In other embodiments, the sleep cycle duration value may be the actual time (e.g., in milliseconds) of a sleep cycle in the power save mode associated with the identified radio access technology.

FIG. 5 illustrates example data tables 500a, 500b, 500c for storing information about each SIM of a tri-SIM tri-standby (TSTS) device. The information stored in the data tables may include values that may be used to calculate an overall priority-based ranking for each SIM, discussed in further detail below with reference to FIG. 6. For example, the data tables in FIG. 5 may include the values generated in method 400, applied to the three SIMs of the TSTS device (identified as "SIM-A," "SIM-B," and "SIM-C"). Values and information included in the entries of data tables 500a, 500b, 500c are provided merely as examples, and are not meant to limit the various data types or values that may be stored therein. In the various embodiments, data tables 500a, 500b, 500c may be stored in a location accessible to the wireless device processor, such as volatile or nonvolatile memory of the wireless device.

Data table 500a may contain characteristics relevant to determining service capability priority values for each SIM. For example, row 502 of data table 500a may provide the service capabilities supported on modem stacks associated with each SIM. Example entries may provide "CS & PS" associated with SIM-A, "PS" associated with SIM-B, and "CS" associated with SIM-C. As another example, row 504 of data table 500a may indicate whether any service capability supported by using the SIM was initially designated by the user as an important service or is frequently used by the user. Example entries may provide, for each SIM, a flag or code indicating "No."

As discussed above with reference to FIG. 4, determining a service capability priority value for a SIM may involve assigning numeric representations to non-numeric characteristics, including service capability information in row 502 entries, and whether the SIM supports any important services (i.e., initial user-designations and/or frequently used services), shown in row 504 entries. In some embodiments, a lower service priority value determined for a SIM may correspond to a higher service-based favorability for registering ahead of other SIMs. That is, a service capability priority value may have an inverse correlation with the service-based priority of the associated SIM. Example entries in row 506, determined based on information in rows 502 and 504, show service capability priority values of "30" for SIM-A, "20" for SIM-B, and "10" for SIM-C. Therefore, in this example SIM-C may be said to have a highest service-based favorability for registering ahead of other SIMs.

Data table 500b may store information relating to the sleep cycle duration values for each SIM. As shown in the row 508, entries of data table 500b may identify the one or more radio access technology implemented by each modem stack associated with a SIM. Example entries in data table 500b may provide radio access technologies of "WCDMA" associated with SIM-A, "GSM" associated with SIM-B, and "LTE" associated with SIM-C.

As discussed above with reference to FIG. 4, the sleep cycle duration values in row 510 may be determined based on the length of the sleep state during power save mode for a radio access technology associated with each SIM. In some embodiments, a scale factor may be applied to the sleep cycle time durations in power saving modes of the radio access technologies in entries of row 510. Resulting scaled representations may be provided as the determined sleep cycle duration values in corresponding entries in row 510. In alternative embodiments, the sleep cycle time duration values provided in entries of row 510 may be actual sleep cycle durations in the power saving modes of the corresponding radio access technologies.

Example entries in row 510 showing the determined sleep cycle duration values include "20" for SIM-A, "30" for SIM-B, and "10" for SIM-C. Based on these entries, a power saving mode associated with GSM standards may provide the longest sleep cycle, followed by a power saving mode associated with WCDMA standards, and with the shortest sleep cycle being part of a power saving mode associated with LTE standards.

Data table 500c may store the most recent attachment time value, which may have been determined dynamically based on the last network registration by the modem stack associated with the SIM. As discussed in further detail below with reference to FIG. 6, the attachment time value may be determined as a function of current conditions of the radio resource and observed network performance or other data collected about the network during previous registration. The observed network performance or other data may include the amount of time taken for the modem stack to register in its network for all services supported by the SIM, as discussed below with reference to FIG. 6. Example entries in data table 500c may provide recent attachment time values of "20" for SIM-A, "30" for SIM-B, and "10" for SIM-C.

While FIG. 5 shows information corresponding to three SIMs, data structures in the various embodiments may be configured to accommodate any number of SIMs provisioned in a multi-SIM device. For example, in a DSDS device one column may be deleted from each of data tables 500a, 500b, 500c, while additional columns may be added if implemented in a device with more than three SIMs. The information shown in the data tables 500a, 500b, 500c may also be provided in any of a number of different arrangements of data fields and/or structures. For example, in some embodiments data tables 500a, 500b, 500c may be part of a single large data structure.

Figure 6:
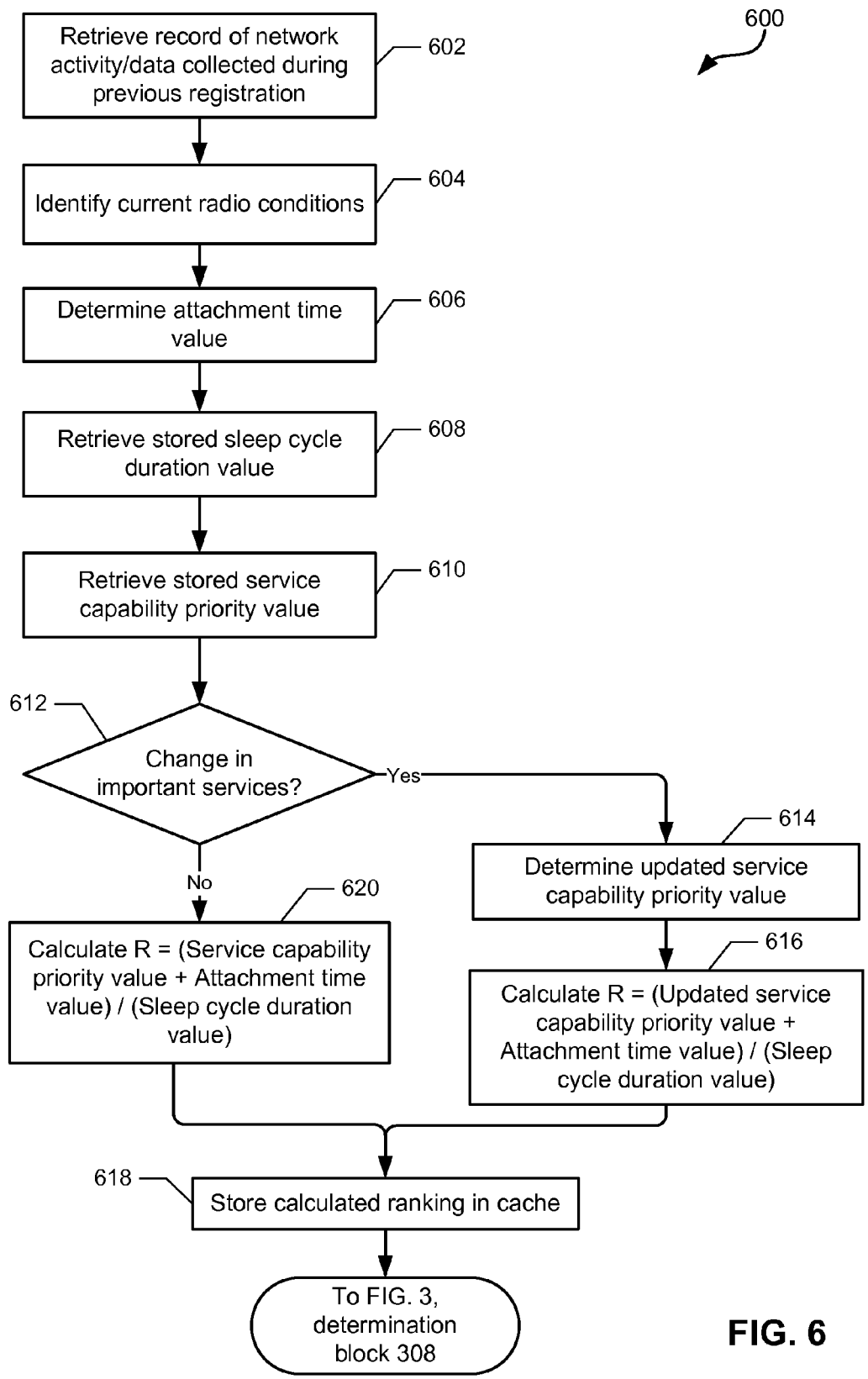
FIG. 6 is a process flow diagram illustrating an embodiment method for performing the calculation of an overall priority best ranking for use in the embodiment illustrated in FIG. 3.

FIG. 6 illustrates an embodiment method 600 of implementing block 306 of method 300 described above with reference to FIG. 3. While method 600 shows steps relating to one example SIM, method 600 may be repeated at registration for each SIM on a multi-SIM device. Therefore, the example SIM may represent any SIM provisioned on the multi-SIM device.

In block 602, the wireless device processor may retrieve data/measurements of observed network activity collected during a registration procedure by the modem stack associated with a SIM. In particular, the retrieved information may include the amount of time taken by the modem stack to register for each service supported by the SIM during one or more previous network registrations. In some embodiments, the recorded data/measurements may be cumulative such that newly collected data may be used to update recorded data/measurements following each registration procedure. In other embodiments, the recorded data/measurements may be limited to network activity monitored during the most recent network registration.

In block 604, the wireless device processor may identify current conditions of the shared radio resource that may affect the wireless device's ability to register in one or more selected networks. Examples of such conditions may include received signal strength measurements on channels of a selected network associated with the SIM, location information affecting signaling on all networks (e.g., underground or other shielded location).

In block 606, the wireless device processor may dynamically determine the attachment time value for the modem stack associated with the SIM. In various embodiments, determining the attachment time value may involve a scaled representation of the amount of time taken by the modem stack to register for each service supported by the SIM during one or more previous network registrations. Alternatively, determining the attachment time value may involve the actual recorded amount of time taken to register for all supported services, or a statistical combination thereof. Further, in some embodiments, determining the attachment time value also may involve deriving a numeric representation for the current radio conditions. Therefore, an example attachment time value may be a function of a scaled representation of the amount of time taken to register for all services on the SIM, and of the numeric representation of current radio conditions. The attachment time value associated with a SIM may be determined dynamically, i.e., upon the wireless device exiting the radio off state and preparing to begin steps for identifying a registration order for the SIMs. In various embodiments determined attachment time values may be directly proportional to the recorded amounts of time taken by the modem stack for registering for each service supported by the SIM. That is, a high attachment time value (e.g., 30) may indicate relatively long registration times recorded for the modem stack of that SIM.

In block 608, the wireless device processor may retrieve the predetermined sleep cycle duration value, such as from an entry in row 510 of data table 500b. In block 610, the wireless device processor may retrieve the determined service capability priority value, for example, from an entry in row 506 of data table 500.

As discussed above with reference to FIGS. 4 and 5, the service capability priority value may be statically-determined based on the services that are supported by the SIM, and based on any initial user designations of important services and/or identified frequently used services. In another embodiment, changes to the user's designations and/or usage pattern may also provide a dynamically-determined updated service capability priority value. Such changes may include, for example, additional services becoming user-designated important services. Through input to a user interface, the user may save such changes in the settings of the wireless device. Alternatively, additional user designations of important services may be session-based (i.e., temporary), and therefore not be saved. Changes in the usage pattern of services may also cause changes to the important services, and therefore changes to the service capability priority value. For example, a service may become a frequently used service based on a user's use of the service above a certain threshold over a monitored period of time. Likewise, a frequently used service may be removed if use of the service drops below a certain threshold over a monitored period of time.

In determination block 612, the wireless device processor may determine whether there are changes in the important services (e.g., change in user-designated important services and/or frequently used services). If the identified important services have changed (i.e., determination block 612="Yes"), in block 614 the wireless device processor may determine an updated service capability priority value for the SIM based on updated important services and on the service capabilities of the modem stack of the SIM.

In block 616, the wireless device processor may calculate an overall priority-based ranking (R) for the SIM according to the following equation:

$$R = \frac{\left(\begin{array}{c}\text{Updated service capability} \\ \text{priority value}\end{array}\right) + \left(\begin{array}{c}\text{Attachment time} \\ \text{value}\end{array}\right)}{(\text{Sleep cycle duration value})}$$

In block 618, the wireless device processor may store the calculated overall priority-based ranking for the SIM in temporary storage (e.g., cache), and may return to determination block 308 of method 300, described above with reference to FIG. 3.

If the important services have not changed (i.e., determination block 612="No"), in block 620 the wireless device processor may calculate an overall priority-based ranking (R) for the SIM using the original service capability priority value, according to the following equation:

$$R = \frac{(\text{Service } capability priority \text{ value}) + (\text{Attachment time value})}{(\text{Sleep cycle duration value})}$$

In block 618, the wireless device processor may store this calculated overall priority-based ranking for the SIM in temporary storage (e.g., cache), and may return to determination block 308 of method 300, described above with reference to FIG. 3.

Figure 7:
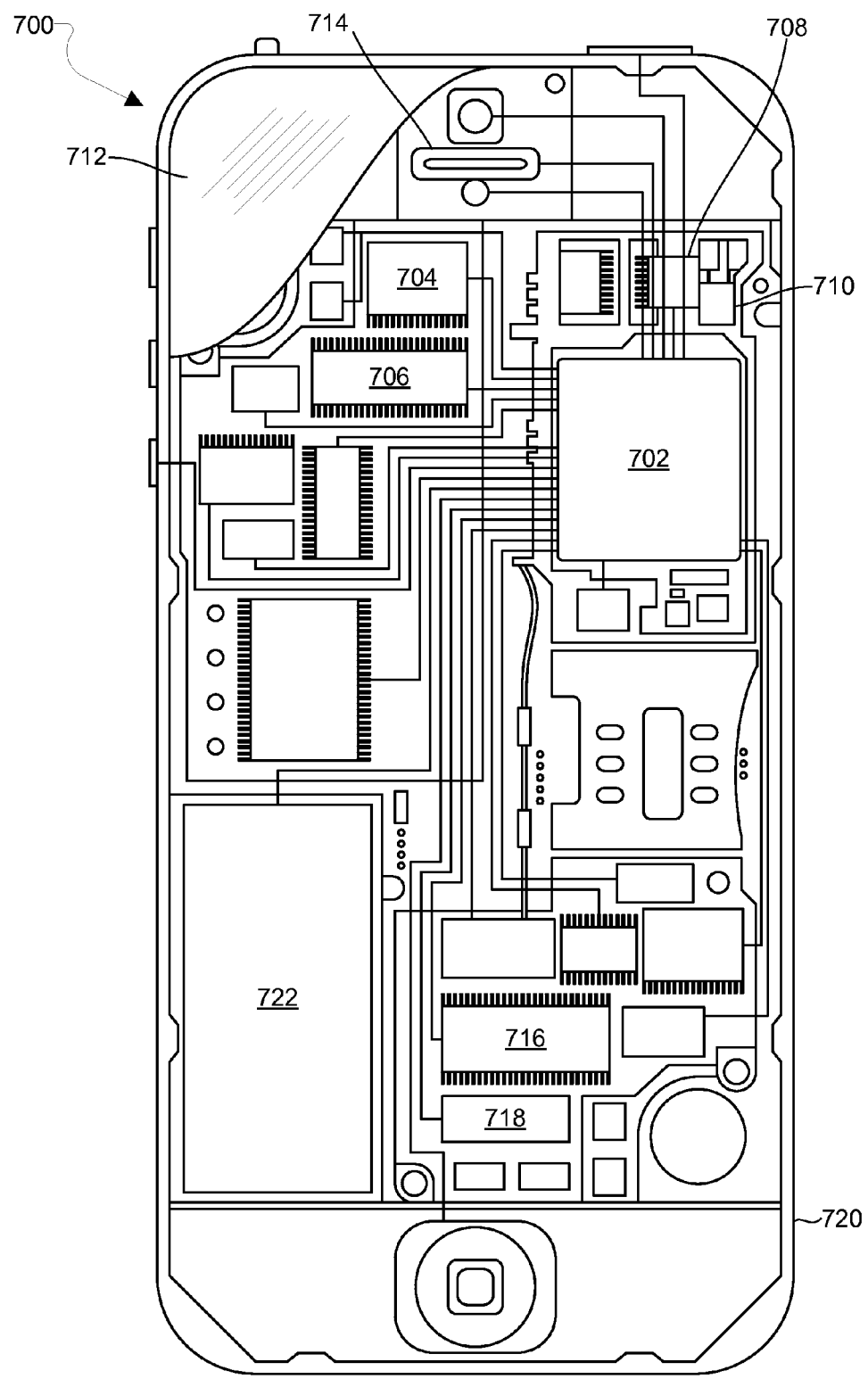
FIG. 7 is a component diagram of an example wireless device suitable for use with the various embodiments.

The various embodiments may be implemented in any of a variety of wireless devices, an example of which is illustrated in FIG. 7. For example, the wireless device 700 may include a processor 702 coupled to a touchscreen controller 704 and an internal memory 706. The processor 702 may be one or more multicore ICs designated for general or specific processing tasks. The internal memory 706 may be volatile or non-volatile memory, and may also be secure and/or encrypted memory, or unsecure and/or unencrypted memory, or any combination thereof.

The touchscreen controller 704 and the processor 702 may also be coupled to a touchscreen panel 712, such as a resistive-sensing touchscreen, capacitive-sensing touchscreen, infrared sensing touchscreen, etc. The wireless device 700 may have one or more radio signal transceivers 708 (e.g., Peanut®, Bluetooth®, Zigbee®, Wi-Fi, RF radio) and antennae 710, for sending and receiving, coupled to each other and/or to the processor 702. The transceivers 708 and antennae 710 may be used with the above-mentioned circuitry to implement the various wireless transmission protocol stacks and interfaces. The multicore device 700 may include a cellular network wireless modem chip 716 that enables communication via a cellular network and is coupled to the processor. The multicore device 700 may include a peripheral device connection interface 718 coupled to the processor 702. The peripheral device connection interface 718 may be singularly configured to accept one type of connection, or multiply configured to accept various types of physical and communication connections, common or proprietary, such as USB, FireWire, Thunderbolt, or PCIe.

The peripheral device connection interface 718 may also be coupled to a similarly configured peripheral device connection port (not shown). The multicore device 700 may also include speakers 714 for providing audio outputs. The multicore device 700 may also include a housing 720, constructed of a plastic, metal, or a combination of materials, for containing all or some of the components discussed herein. The multicore device 700 may include a power source 722 coupled to the processor 702, such as a disposable or rechargeable battery. The rechargeable battery may also be coupled to the peripheral device connection port to receive a charging current from a source external to the multicore device 700.

Figure 8:
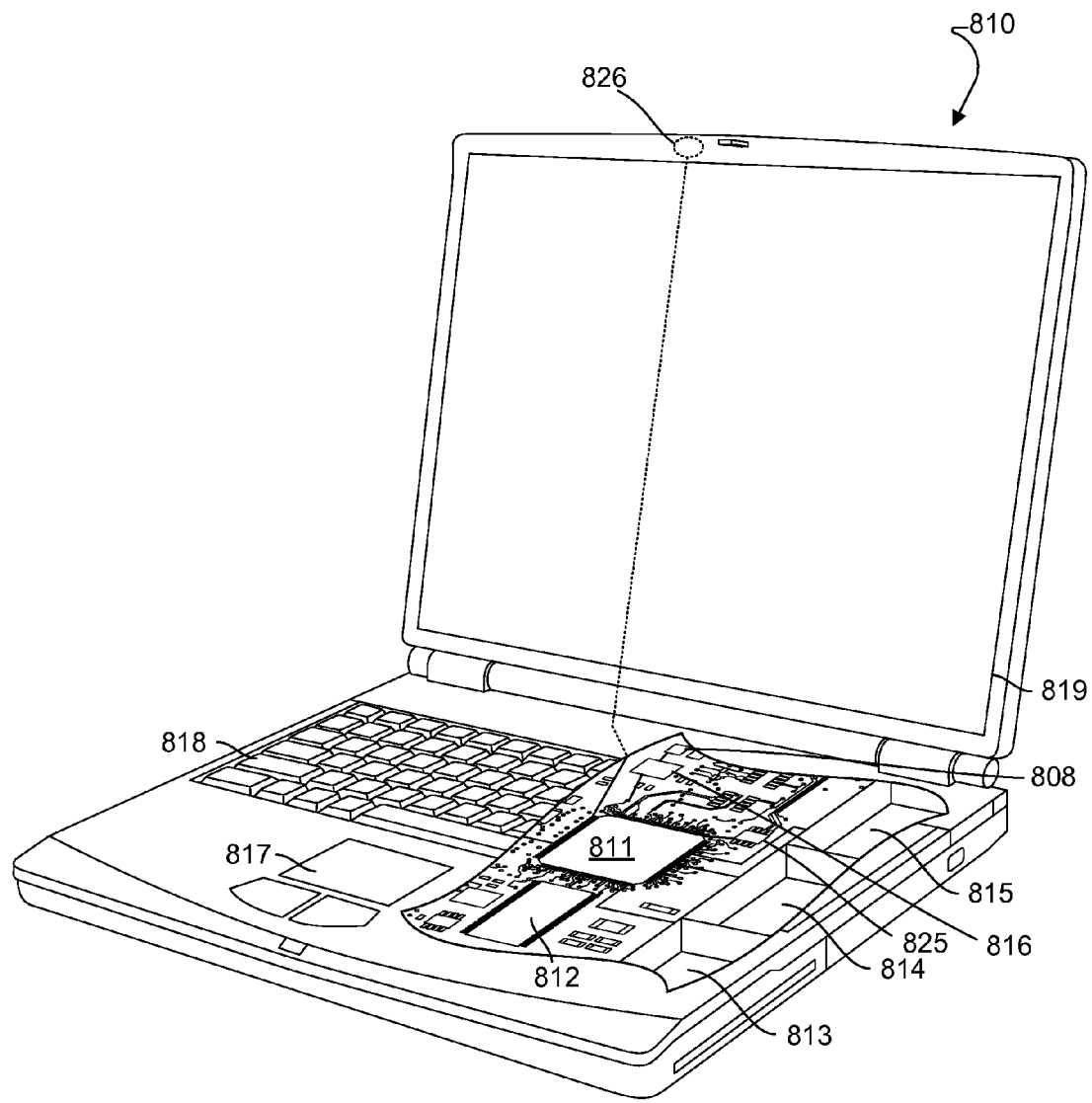
FIG. 8 is a component diagram of another example wireless device suitable for use with the various embodiments.

The various embodiments described above may also be implemented within a variety of personal computing devices, such as a laptop computer 800 as illustrated in FIG. 8. Many laptop computers include a touch pad touch surface 817 that serves as the computer's pointing device, and thus may receive drag, scroll, and flick gestures similar to those implemented on wireless computing devices equipped with a touch screen display and described above. A laptop computer 800 will typically include a processor 811 coupled to volatile memory 812 and a large capacity nonvolatile memory, such as a disk drive 813 of Flash memory. The computer 800 may also include a floppy disc drive 814 and a compact disc (CD) drive 815 coupled to the processor 811. The computer 800 may also include a number of connector ports coupled to the processor 811 for establishing data connections or receiving external memory devices, such as a USB or FireWire® connector sockets, or other network connection circuits for coupling the processor 811 to a network. In a notebook configuration, the computer housing includes the touchpad 817, the keyboard 818, and the display 819 all coupled to the processor 811. Other configurations of the computing device may include a computer mouse or trackball coupled to the processor (e.g., via a USB input) as are well known, which may also be use in conjunction with the various embodiments.

The processors 702, 811 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 706, 812, 813 before they are accessed and loaded into the processors 702, 811. Processors 702, 811 may include internal memory sufficient to store the application software instructions. In many devices the internal memory may be a volatile or nonvolatile memory, such as flash memory, or a mixture of both. For the purposes of this description, a general reference to memory refers to memory accessible by the processors 702, 811, including internal memory or removable memory plugged into the device and memory within the processor 702, 811, themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various embodiments to a particular order, sequence, type of network or carrier.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of controlling use of a radio resource for efficient network registration on a multi-subscriber identification module (SIM) wireless communication device having at least a first SIM and a second SIM associated with a single radio resource, when the multi-SIM wireless communication device is coupled with the first and second SIMs, the method comprising:
dynamically calculating an overall priority-based ranking associated with each of the first and second SIMs;
setting a preferred registration order for the first and second SIMs based on the calculated overall priority-based rankings, wherein the preferred registration order establishes a relative sequence among the first SIM and the second SIM for service registration; and
granting use of the radio resource to modem stacks associated with the first and second SIMs according to the relative sequence established by the preferred registration order.

2. The method of claim 1, wherein granting use of the radio resource to modem stacks associated with the first and second SIMs according to the relative sequence established by the preferred registration order comprises:
identifying a top registration priority SIM based on the preferred registration order;
granting use of the radio resource to a modem stack associated with the top registration priority SIM according to the preferred registration order;
determining whether the top registration priority SIM has successfully registered for service in a selected network associated with the top registration priority SIM;
allowing a next SIM in the preferred registration order to register for service in a selected network associated with the next SIM in response to determining that the top registration priority SIM has successfully registered for service; and
preventing the next SIM in the preferred registration order from registering for service in response to determining that the top registration priority SIM has not successfully registered for service.

3. The method of claim 1, wherein dynamically calculating an overall priority-based ranking associated with each of the first and second SIMs comprises:
determining for each SIM at least one of a service capability priority value, an attachment time value, and a sleep cycle duration value; and
applying a prioritization equation to the at least one of the determined service capability priority value, attachment time value, and sleep cycle duration value for each SIM, wherein a result of the prioritization equation comprises the overall priority-based ranking associated with the SIM.

4. The method of claim 3, wherein:
the service capability priority value for each SIM comprises a function of service capabilities supported by the SIM and of important services associated with the SIM, wherein the important services associated with the SIM include services designated by a user and services that the multi-SIM wireless communication device determines are frequently used by the user;
the attachment time value for each SIM comprises a dynamically determined function of at least one observed amount of time taken for the SIM to register in its respectively associated selected network for all supported services, and of current conditions of the shared single radio resource; and
the sleep cycle duration value for each SIM is based on properties of a power saving mode of a radio access technology implemented by a modem stack associated with the SIM.

5. The method of claim 4, wherein the prioritization equation is applied to at least a determined service capability priority value for each SIM, and wherein determining the service capability priority value for each SIM comprises:
assigning a first numeric representation for each service capability supported by the SIM;
assigning a second numeric representation indicating that a service associated with the SIM is an important service; and
assigning a third numeric representation indicating that a service supported by the SIM is not an important service,
wherein the function of the service capabilities supported by the SIM and of the important services associated with the SIM comprises a function of the first, second and third numeric representations.

6. The method of claim 4, further comprising:
inputting an updated service capability priority value for each SIM, wherein the updated service capability priority value for each SIM is a function of service capabilities supported by the SIM and of changes to the important services associated with the SIM.

7. The method of claim 6, wherein applying the prioritization equation for each SIM comprises:
calculating a sum of the service capability priority value and the attachment time value determined for the SIM; and
dividing the sum by the sleep cycle duration value determined for the SIM.

8. A wireless communication device, comprising:
a radio resource associated with a first subscriber identification module (SIM) and a second SIM;
a processor coupled to the radio resource, wherein the processor is configured with processor-executable instructions to:
dynamically calculate an overall priority-based ranking associated with each of the first and second SIMs;
set a preferred registration order for the first and second SIMs based on the calculated overall priority-based rankings, wherein the preferred registration order establishes a relative sequence among the first SIM and the second SIM for service registration; and
grant use of the radio resource to modem stacks associated with the first and second SIMs according to the relative sequence established by the preferred registration order.

9. The wireless communication device of claim 8, wherein the processor is further configured with processor-executable instructions to grant use of the radio resource to modem stacks associated with the first and second SIMs according to the relative sequence established by the preferred registration order by:
identifying a top registration priority SIM based on the preferred registration order;
granting use of the radio resource to a modem stack associated with the top registration priority SIM according to the preferred registration order;
determining whether the top registration priority SIM has successfully registered for service in a selected network associated with the top registration priority SIM;
allowing a next SIM in the preferred registration order to register for service in a selected network associated with the next SIM in response to determining that the top registration priority SIM has successfully registered for service; and preventing the next SIM in the preferred registration order from registering for service in response to determining that the top registration priority SIM has not successfully registered for service.

10. The wireless communication device of claim 8, wherein the processor is further configured with processor-executable instructions to dynamically calculate an overall priority-based ranking associated with each of the first and second SIMs by:

determining for each SIM at least one of a service capability priority value, an attachment time value, and a sleep cycle duration value; and applying a prioritization equation to the at least one of the determined service capability priority value, attachment time value, and sleep cycle duration value for each SIM, wherein a result of the prioritization equation comprises the overall priority-based ranking associated with the SIM.

11. The wireless communication device of claim 10, wherein the processor is configured with processor-executable instructions:

the service capability priority value for each SIM comprises a function of service capabilities supported by the SIM and of important services associated with the SIM, wherein the important services associated with the SIM include services designated by a user and services that the multi-SIM wireless communication device determines are frequently used by the user;

the attachment time value for each SIM comprises a dynamically determined function of at least one observed amount of time taken for the SIM to register in its respectively associated selected network for all supported services, and of current conditions of the radio resource; and the sleep cycle duration value for each SIM is based on properties of a power saving mode of a radio access technology implemented by a modem stack associated with the SIM.

12. The wireless communication device of claim 11, wherein the:

the prioritization equation is applied to at least a determined service capability priority value for each SIM;

the processor is further configured with processor-executable instructions to determine the service capability priority value for each SIM comprises by:

assigning a first numeric representation for each service capability supported by the SIM;

assigning a second numeric representation indicating that a service associated with the SIM is an important service; and assigning a third numeric representation indicating that a service supported by the SIM is not an important service; and the function of the service capabilities supported by the SIM and of the important services associated with the SIM comprises a function of the first, second and third numeric representations.

13. The wireless communication device of claim 11, wherein the processor is further configured with processor-executable instructions to:

inputting an updated service capability priority value for each SIM, wherein the updated service capability priority value for each SIM is a function of service capabilities supported by the SIM and of changes to the important services associated with the SIM.

14. The wireless communication device of claim 13, wherein the processor is further configured with processor-executable instructions to apply the prioritization equation for each SIM by:

calculating a sum of the service capability priority value and the attachment time value determined for the SIM; and dividing the sum by the sleep cycle duration value determined for the SIM.

15. A wireless communication device, comprising:

means for dynamically calculating an overall priority-based ranking for each of a first subscriber identification module (SIM) and a second SIM, wherein the first and second SIMs are both associated with a radio resource;

means for setting a preferred registration order for the first and second SIMs based on the calculated overall priority based rankings, wherein the preferred registration order establishes a relative sequence among the first SIM and the second SIM for service registration; and means for granting use of the radio resource to modem stacks associated with the first and second SIMs according to the relative sequence established by the preferred registration order.

16. The wireless communication device of claim 15, wherein means for granting use of the radio resource to modem stacks associated with the first and second SIMs according to the relative sequence establish by the preferred registration order comprises:

means for identifying a top registration priority SIM based on the preferred registration order;

means for granting use of the radio resource to a modem stack associated with the top registration priority SIM according to the preferred registration order;

means for determining whether the top registration priority SIM has successfully registered for service in a selected network associated with the top registration priority SIM;

means for allowing a next SIM in the preferred registration order to register for service in a selected network associated with the next SIM in response to determining that the top registration priority SIM has successfully registered for service; and means for preventing the next SIM in the preferred registration order from registering for service in response to determining that the top registration priority SIM has not successfully registered for service.

17. The wireless communication device of claim 15, wherein means for dynamically calculating an overall priority-based ranking associated with each of the first and second SIMs comprises:

means for determining for each SIM at least one of a service capability priority value, an attachment time value, and a sleep cycle duration value; and means for applying a prioritization equation to the at least one of the determined service capability priority value, attachment time value, and sleep cycle duration value for each SIM, wherein a result of the prioritization equation comprises the overall priority-based ranking associated with the SIM.

18. The wireless communication device of claim 17, wherein:

the service capability priority value for each SIM comprises a function of service capabilities supported by the SIM and of important services associated with the SIM, wherein the important services associated with the SIM include services designated by a user and services that the multi-SIM wireless communication device determines are frequently used by the user;

the attachment time value for each SIM comprises a dynamically determined function of at least one observed amount of time taken for the SIM to register in its respectively associated selected network for all supported services, and of current conditions of the radio resource; and the sleep cycle duration value for each SIM is based on properties of a power saving mode of a radio access technology implemented by a modem stack associated with the SIM.

19. The wireless communication device of claim 18, wherein:

the prioritization equation is applied to at least a determined service capability priority value for each SIM;

means for determining the service capability priority value for each SIM comprises:

means for assigning a first numeric representation for each service capability supported by the SIM;

means for assigning a second numeric representation indicating that a service associated with the SIM is an important service; and means for assigning a third numeric representation indicating that a service supported by the SIM is not an important service; and the function of the service capabilities supported by the SIM and of the important services associated with the SIM comprises a function of the first, second and third numeric representations.

20. The wireless communication device of claim 18, further comprising:

means for inputting an updated service capability priority value for each SIM, wherein the updated service capability priority value for each SIM is a function of service capabilities supported by the SIM and of changes to the important services associated with the SIM.

21. The wireless communication device of claim 20, wherein means for applying the prioritization equation for each SIM comprises:

means for calculating a sum of the service capability priority value and the attachment time value determined for the SIM; and means for dividing the sum by the sleep cycle duration value determined for the SIM.

22. A non-transitory processor-readable medium having stored thereon processor-executable instructions configured to cause a processor of a multi-subscriber identification module (SIM) wireless communication device to perform operations comprising:

dynamically calculating an overall priority-based ranking associated with each of a first SIM and a second SIM, wherein the first and second SIMs are both associated with a radio resource of the multi-SIM wireless communication device;

setting a preferred registration order for the first and second SIMs based on the calculated overall priority-based rankings, wherein the preferred registration order establishes a relative sequence among the first SIM and the second SIM for service registration in selected networks associated with the first and second SIMs; and granting use of the radio resource to modem stacks associated with the first and second SIMs according to the relative sequence established by the preferred registration order.

23. The non-transitory processor-readable medium of claim 22, wherein the stored processor-executable instructions are configured to cause the multi-SIM wireless communication device processor to perform operations such that granting use of the radio resource to modem stacks associated with the first and second SIMs according to the relative sequence established by the preferred registration order comprises:

identifying a top registration priority SIM based on the preferred registration order;

granting use of the radio resource to a modem stack associated with the top registration priority SIM according to the preferred registration order;

determining whether the top registration priority SIM has successfully registered for service in a selected network associated with the top registration priority SIM;

allowing a next SIM in the preferred registration order to register for service in a selected network associated with the next SIM in response to determining that the top registration priority SIM has successfully registered for service; and preventing the next SIM in the preferred registration order from registering for service in response to determining that the top registration priority SIM has not successfully registered for service.

24. The non-transitory processor-readable medium of claim 22, wherein the stored processor-executable instructions are configured to cause the multi-SIM wireless communication device processor to perform operations such that dynamically calculating an overall priority-based ranking associated with each of the first and second SIMs comprises:

determining for each SIM at least one of a service capability priority value, an attachment time value, and a sleep cycle duration value; and applying a prioritization equation to the at least one of the determined service capability priority value, attachment time value, and sleep cycle duration value for each SIM, wherein a result of the prioritization equation comprises the overall priority-based ranking associated with the SIM.

25. The non-transitory processor-readable medium of claim 24, wherein the stored processor-executable instructions are configured to cause the multi-SIM wireless communication device processor to perform operations such that:

the service capability priority value for each SIM comprises a function of service capabilities supported by the SIM and of important services associated with the SIM, wherein the important services associated with the SIM include services designated by a user and services that the multi-SIM wireless communication device determines are frequently used by the user;

the attachment time value for each SIM comprises a dynamically determined function of at least one observed amount of time taken for the SIM to register in its respectively associated selected network for all supported services, and of current conditions of the radio resource; and the sleep cycle duration value for each SIM is based on properties of a power saving mode of a radio access technology implemented by a modem stack associated with the SIM.

26. The non-transitory processor-readable medium of claim 25, wherein the stored processor-executable instructions are configured to cause the multi-SIM wireless communication device processor to perform operations such that:
  the prioritization equation is applied to at least a determined service capability priority value for each SIM;
  determining the service capability priority value for each SIM comprises:
    assigning a first numeric representation for each service capability supported by the SIM;
    assigning a second numeric representation indicating that a service associated with the SIM is an important service; and
    assigning a third numeric representation indicating that a service supported by the SIM is not an important service; and
  the function of the service capabilities supported by the SIM and of the important services associated with the SIM comprises a function of the first, second and third numeric representations.

27. The non-transitory processor-readable medium of claim 25, wherein the stored processor-executable instructions are configured to cause the multi-SIM wireless communication device processor to perform operations further comprising:
  inputting an updated service capability priority value for each SIM, wherein the updated service capability priority value for each SIM is a function of service capabilities supported by the SIM and of changes to the important services associated with the SIM.

28. The non-transitory processor-readable medium of claim 27, wherein the stored processor-executable instructions are configured to cause the multi-SIM wireless communication device processor to perform operations such that applying the prioritization equation for each SIM comprises:
  calculating a sum of the service capability priority value and the attachment time value determined for the SIM; and
  dividing the sum by the sleep cycle duration value determined for the SIM.

\* \* \* \* \*